(12) United States Patent
Miyanaga

(10) Patent No.: US 8,371,775 B2
(45) Date of Patent: Feb. 12, 2013

(54) SHANK ATTACHMENT STRUCTURE

(75) Inventor: Masaaki Miyanaga, Miki (JP)

(73) Assignee: Kabushiki Kaisha Miyanaga, Miki-shi (JP)

( * ) Notice: Subject to any disclaimer, the term of this patent is extended or adjusted under 35 U.S.C. 154(b) by 838 days.

(21) Appl. No.: 12/302,498

(22) PCT Filed: May 18, 2007

(86) PCT No.: PCT/JP2007/060233
§ 371 (c)(1),
(2), (4) Date: Aug. 28, 2009

(87) PCT Pub. No.: WO2007/138890
PCT Pub. Date: Dec. 6, 2007

(65) Prior Publication Data
US 2010/0007101 A1    Jan. 14, 2010

(30) Foreign Application Priority Data

May 31, 2006   (JP) ................................ 2006-151053

(51) Int. Cl.
*B23Q 11/10*   (2006.01)
(52) U.S. Cl. ................. 408/57; 279/20; 279/75; 408/56
(58) Field of Classification Search ............... 279/20, 279/74, 75; 408/56, 57, 60, 240, 239 R
See application file for complete search history.

(56) References Cited

U.S. PATENT DOCUMENTS

| | | | | |
|---|---|---|---|---|
| 2,135,861 A | * | 11/1938 | Thompson | 409/266 |
| 3,091,473 A | * | 5/1963 | Bilz | 279/76 |
| 4,135,418 A | * | 1/1979 | McCray et al. | 82/159 |
| 4,626,152 A | * | 12/1986 | Palm | 409/232 |
| 4,688,975 A | | 8/1987 | Palm | |

(Continued)

FOREIGN PATENT DOCUMENTS

| | | |
|---|---|---|
| DE | 3926025 C1 * | 3/1991 |
| EP | 1 016 480 A1 | 7/2000 |

(Continued)

OTHER PUBLICATIONS

Decision on Grant for Russian Patent Application 2008152393/02(069061), dated Jun. 8, 2010.

(Continued)

*Primary Examiner* — Daniel Howell
*Assistant Examiner* — Paul M Janeski
(74) *Attorney, Agent, or Firm* — Marshall, Gerstein & Borun LLP

(57) ABSTRACT

A shank attachment structure which may supply coolant even if a drill without a center pin is attached. A shank can be attached to a shank attachment hole with a single motion. The outer diameter of the shank can be inserted into the shank attachment hole. A chamfered portion is formed around an edge of a base end, and an elongated concave portion is formed on a tip end. A coolant hole is formed on a base end of the shank attachment hole, and a valve body is disposed in the hole. A sealing member is disposed adjacent to the tip end side. A first sleeve is disposed such that a base of the shank moves the first sleeve, so that a base of the sleeve separates from the sealing member; and when the shank is not in contact with the tip, an outer peripheral surface of the first sleeve moves the engaging member radially outwardly.

9 Claims, 11 Drawing Sheets

U.S. PATENT DOCUMENTS 5,674,031 A * 10/1997 Bilz et al. .......................... 408/6
2005/0244234 A1* 11/2005 Voss et al. ........................ 408/56

FOREIGN PATENT DOCUMENTS

| JP | 60-97218 | 7/1985 |
| JP | 07-009211 | 1/1995 |
| JP | 07-009226 | 1/1995 |
| RU | 2 049 600 C1 | 12/1995 |
| RU | 2 168 397 C2 | 6/2001 |
| SU | 1673295 A1 | 8/1991 |
| WO | WO 9712721 A1 * | 4/1997 |
| WO | WO-98/37999 A | 9/1998 |

OTHER PUBLICATIONS

International Search Report for PCT/JP2007/060233, dated Aug. 7, 2007.

* cited by examiner

SHANK ATTACHMENT STRUCTURE

TECHNICAL FIELD

The present invention relates to a shank attachment structure by which a shank of a cutter can be attached to an arbor of a drilling device with a single motion, that is, quickly and easily.

BACKGROUND ART

Conventionally known is a shank attachment structure by which a shank of a cutter can be attached with a single motion to an arbor whose base end is attached to a drilling device (electrically-powered drill or drill press). In the case of this one-touch shank attachment structure, only by inserting the shank of the cutter into a shank attachment hole which opens on a lower surface of the arbor, the shank of the cutter can be attached to the arbor with a single motion by a fixing mechanism formed on the shank of the cutter and the arbor (see Patent Document 1).

In order to solve the technical problems of the above shank attachment structure, the present applicant has provided a simply-configured shank attachment structure by which the cutter can be detached from the arbor by operating a detachment sleeve with one hand, the shank does not drop off even if something accidentally contacts the sleeve during the rotation of the drilling device, and a coolant (cutting fluid) can be supplied internally (see Patent Document 2).

Patent Document 1: Japanese Unexamined Patent Application Publication Hei 7-9211
Patent Document 2: WO 98/37999

DISCLOSURE OF THE INVENTION

Problems to be Solved by the Invention

However, in the case of the shank attachment structure described in Patent Document 2, the coolant can be supplied only when the drill has a center pin, and the coolant cannot be supplied when the drill, such as a core drill, does not have the center pin. Further, in the case of the shank attachment structure described in Patent Document 2, the amount of the coolant cannot be adjusted in accordance with, for example, cutting conditions.

The present invention was made in light of the above circumstances, and an object of the present invention is to provide a shank attachment structure which solves the above problems.

Means for Solving the Problems

The object of the present invention can be achieved by a shank attachment structure configured as below.

A shank attachment structure according to the present invention is capable of detachably attaching a shank of a cutter to a tubular shank attachment hole with a single motion, the shank having at a base end portion thereof a concave portion for holding a part of an engaging member, and the shank attachment hole being formed such that: the engaging member projects radially inwardly from an inner peripheral surface of the shank attachment hole and is able to move radially outwardly therefrom; a longitudinal direction of the shank attachment hole extends in a body portion of an arbor in an axial direction of the arbor; and a tip end of the shank attachment hole opens on a tip end surface of the body portion, wherein: a coolant supplying hole is formed at a central portion of the body portion in a radial direction of the body portion and is adjacent to a base end side of the shank attachment hole such that a tip end of the coolant supplying hole communicates with the shank attachment hole; a valve body is disposed at a tip end portion of the coolant supplying hole so as to be movable toward a base end side, and a sealing member is disposed at a position of the coolant supplying hole which is closer to a tip end side than the valve body and contacts the valve body to form a fluid-tight state between the valve body and the sealing member; a first sleeve is disposed in the shank attachment hole such that: a base end of the shank contacts a tip end of the first sleeve to cause the first sleeve to move toward the base end side in the axial direction; a pressing portion contacts the valve body by this movement of the first sleeve to cause the valve body to be separated from the sealing member; in a state in which the shank is not in contact with the tip end of the first sleeve, an outer peripheral surface of the first sleeve having an outer diameter substantially equal to a diameter of the shank attachment hole causes the engaging member to move radially outwardly from an inner peripheral surface of the shank attachment hole; and a valve body operating member having at a base end thereof the pressing portion which presses the valve body to cause the valve body to be separated from the sealing member and having at a tip end thereof a contact surface which is contacted by the shank is disposed in the shank attachment hole.

In accordance with the shank attachment structure according to the present invention configured as above, when the shank of the cutter is inserted into the shank attachment hole of the body portion of the arbor, the base end of the shank causes the valve body operating member, disposed in the shank attachment hole of the body portion of the arbor, to move toward the base end side of the shank attachment hole. By this movement of the valve body operating member, the pressing portion of the valve body operating member causes the valve body to move toward the base end side, thereby causing the valve body to be separated from the sealing member. Therefore, it is possible to supply the coolant to the cutter only at the time of drilling even if the cutter does not have the center pin.

Moreover, when the shank of the cutter is inserted into the shank attachment hole of the body portion of the arbor, the base end of the shank causes the first sleeve, disposed in the shank attachment hole of the body portion of the arbor, to move toward the base end side of the shank attachment hole, causing the engaging member to project radially inwardly from the inner peripheral surface of the body portion. Thus, a part of the engaging member is engaged with the concave portion of the shank. As a result, the shank can be attached to the arbor with a single motion.

In the shank attachment structure, the first sleeve and the valve body operating member may be integrally connected to each other. In such case, the number of components can be reduced.

In the shank attachment structure, the valve body and the valve body operating member may be integrally connected to each other. In such case, the number of components can be reduced.

In the shank attachment structure, an outer diameter of the shank may be set such that the shank is able to be inserted into the shank attachment hole in a state in which the engaging member has moved radially outwardly from the inner peripheral surface of the shank attachment hole; the concave portion may be formed at the base end portion of the shank to have an elongated shape such that the shank is movable in the axial direction of the arbor for a predetermined distance in a state in which a part of the engaging member is held in the concave portion; and the first sleeve may cause the valve body to be separated from the sealing member in a state in which the engaging member is located at a tip end position of the elongated concave portion of the shank, and the first sleeve may not cause the valve body to be separated from the sealing member in a state in which the engaging member is located at a base end position of the elongated concave portion of the shank. In this case, in a state in which the engaging member of the arbor is locked by the concave portion of the shank, that is, the cutter is locked by the arbor, the coolant can be supplied when the engaging member is located at the tip end position of the elongated concave portion of the shank, and the supply of the coolant stops when the engaging member is located at the base end position of the elongated concave portion of the shank.

To be specific, in a state in which the tip end of the cutter is in contact with a surface to be processed when drilling the surface to be processed by the cutter, the valve body is not separated from the sealing member, and the coolant is not supplied to the cutter. When the cutter is further pressed toward the base end side from the above state, the engaging member of the arbor moves toward the tip end side in the concave portion of the shank of the cutter, and the shank of the cutter is further inserted into the shank attachment hole of the arbor. As a result, the base end of the shank causes the first sleeve of the arbor to move toward the base end side to press the valve body toward the base end side, thereby causing the valve body to be separated from the sealing member. Therefore, since a gap is formed between the valve body and the sealing member, the coolant having been supplied in the coolant supplying hole is supplied from the gap through the shank attachment hole to the cutter.

Thus, the coolant can be supplied to a drilling portion only at the time of drilling even if the cutter does not have the center pin.

Moreover, in the shank attachment structure, a ring-shaped engaging concave portion may be formed along a circumferential direction of the shank attachment hole at a position of a tip end side of the shank attachment hole which position is adjacent to a tip end of a region where the first sleeve moves in the axial direction, and a retaining ring member may be disposed at the engaging concave portion so as to have an inner diameter that is a minimum diameter portion which is slightly smaller than an outer diameter of a base end of the shank and an outer diameter that is a maximum diameter portion which is larger than an outer diameter of the concave portion in a free state, so as to have such a wavy ring shape that a part of the retaining ring member projects radially outwardly from a virtual perfect circle and the other part is depressed from the virtual perfect circle, and so as to be formed such that the radially outwardly projecting part is deformable in an axial direction of the shank attachment hole. In this case, when inserting the shank into the shank attachment hole, the retaining ring member deforms with the retaining ring member locked by the engaging concave portion, and allows the shank to pass through the retaining ring member and be further deeply inserted into the shank attachment hole. Moreover, when pulling out the shank from the shank attachment hole, the retaining ring member deforms with the retaining ring member locked by the engaging concave portion, and only the shank can be pulled out from the shank attachment hole.

By the retaining ring member, the first sleeve is maintained in the shank attachment hole when the shank is inserted into and pulled out from the shank attachment hole. Therefore, the first sleeve can be maintained in the shank attachment hole with an extremely simple configuration.

Moreover, in the shank attachment structure, a thickness of a wall of the body portion on which wall the engaging member is disposed may be set to be smaller than a dimension of the engaging member in a thickness direction of the wall; a supporting hole for supporting the engaging member may be formed on the wall so as to extend in a direction perpendicular to the axial direction such that a radially inner end of the supporting hole opens on the inner peripheral surface of the shank attachment hole within the region where the first sleeve moves in the axial direction in the shank attachment hole and a radially outer end of the supporting hole opens on an outer peripheral surface of the wall; a first elastic member may be disposed on a base end side of the first sleeve in the shank attachment hole to bias the first sleeve, causing a tip end of the first sleeve to contact the retaining ring member; and a second sleeve including a first cam surface protruding radially inwardly and a second cam surface on an inner peripheral surface thereof may be disposed on an outer peripheral side of the body portion so as to be movable in one of a direction toward the tip end and a direction toward the base end in the axial direction of the arbor, so as to be able to press the engaging member radially inwardly in the supporting hole by the first cam surface in a state in which the second sleeve has moved in the above one of the directions, and so as to be able to hold the engaging member radially outwardly by the second cam surface in a state in which the second sleeve has not moved, the second sleeve may be pressed in the above one of the directions by an elastic force of a second elastic member to cause a part of the engaging member to be held in the concave portion of the shank, and the second sleeve may be kept not to move against the elastic force of the second elastic member such that the engaging member is able to move radially outwardly in the supporting hole. In this case, when the shank is simply inserted into the shank attachment hole of the arbor in a state in which the second sleeve has been moved in a direction opposite the above one of the directions (direction toward the base end side and direction toward the tip end side), the engaging member moves on the outer peripheral surface of the shank in a relatively axial direction while keeping contacting the outer peripheral surface of the shank, and then a radially inner part of the engaging member is held in the concave portion of the shank.

As above, when the engaging member is held in the concave portion, engagement between the engaging member and the second sleeve is canceled, and the second sleeve moves in the above one of the directions by the elastic force of the second elastic member. As a result, the shank is locked and supported in the shank attachment hole of the arbor. Thus, the shank can be attached to the shank attachment hole of the arbor with a single motion.

In contrast, when the second sleeve is moved in a direction opposite the above one of the directions in the case of detaching the shank from the arbor, the engaging member a part of which has been held in the concave portion can move radially outwardly, and engagement between the engaging member and the concave portion of the shank is canceled. As a result, the shank of the cutter can be easily detached from the arbor.

Therefore, when attaching the shank, a user just have to insert the shank to the shank attachment hole of the arbor, and when detaching the shank, the user just have to cause the second sleeve to move in a direction opposite the above one of the directions against the second elastic member. Thus, the shank can be detached easily. That is, the shank can be attached to and detached from the arbor easily even with one hand. Moreover, the shank can be detached from the arbor by causing the second sleeve to slide in a direction opposite the above one of the directions (direction toward the tip end side and direction toward the base end side). Therefore, the shank does not drop off even if something accidentally contacts the second sleeve during the rotation of the device as in the conventional cases. Especially, in the case of realizing such a configuration that engagement between the engaging member and the second sleeve is canceled by pressing the second sleeve toward the base end side to cause the second sleeve to slide toward the base end side, even if an object to be drilled has a foreign matter or a projection and the second sleeve contacts the foreign matter or the projection, the shank does not drop off from the arbor, which is excellent in configuration.

Moreover, in light of the configuration, especially in light of working, since the shank attachment structure according to the present invention can be realized only by working of a circular part or working of a combination of circular parts, it is easily worked, and assembling of the parts is easily carried out.

Moreover, in the shank attachment structure, a first coolant supplying passage whose tip end communicates with the coolant supplying hole and whose base end is exposed on an outer peripheral surface of the body portion may be formed in the body portion of the arbor; a fixing member including: a second coolant supplying passage having a ring-shaped passage which opens on an inner peripheral surface of the fixing member; a third coolant supplying passage whose tip end communicates with a base end of the second coolant supplying passage and whose base end is exposed on an outer periphery of the fixing member; and a tubular body portion supporting hole which rotatably supports the body portion on an outer peripheral side may be disposed on an outer peripheral side of the body portion such that a tip end of the second coolant supplying passage communicates with the base end of the first coolant supplying passage; and a coolant flow rate adjusting mechanism capable of changing a cross section of the third coolant supplying passage may be disposed on the third coolant supplying passage of the fixing member. In this case, by operating the flow rate adjusting mechanism, a necessary and sufficient amount of coolant can be supplied from the third coolant supplying passage through the second coolant supplying passage, the first coolant supplying passage and the coolant supplying hole to a drilling portion of the cutter.

Moreover, in the shank attachment structure, the flow rate adjusting mechanism may include: a tapered hole formed on the third coolant supplying passage; a tapered core member having an outer shape corresponding to the tapered hole; and a thread mechanism which is able to cause the tapered core member to move close to or move away from the tapered hole. In this case, it is possible to realize the flow rate adjusting mechanism which can adjust the flow rate correctly with a simple configuration.

Moreover, in the shank attachment structure, the engaging member may be a sphere, the sealing member may be an O ring made of an elastic member, and the sphere may be biased by a coil spring toward the sealing member. In this case, the configuration is simple, and working and assembling are easy.

Effects of the Invention

In accordance with the shank attachment structure of the present invention, even if the drill does not have the center pin, it is possible to supply a necessary amount of coolant only at the time of working with a simple configuration.

EXPLANATION OF REFERENCE NUMBERS

Figure 1:
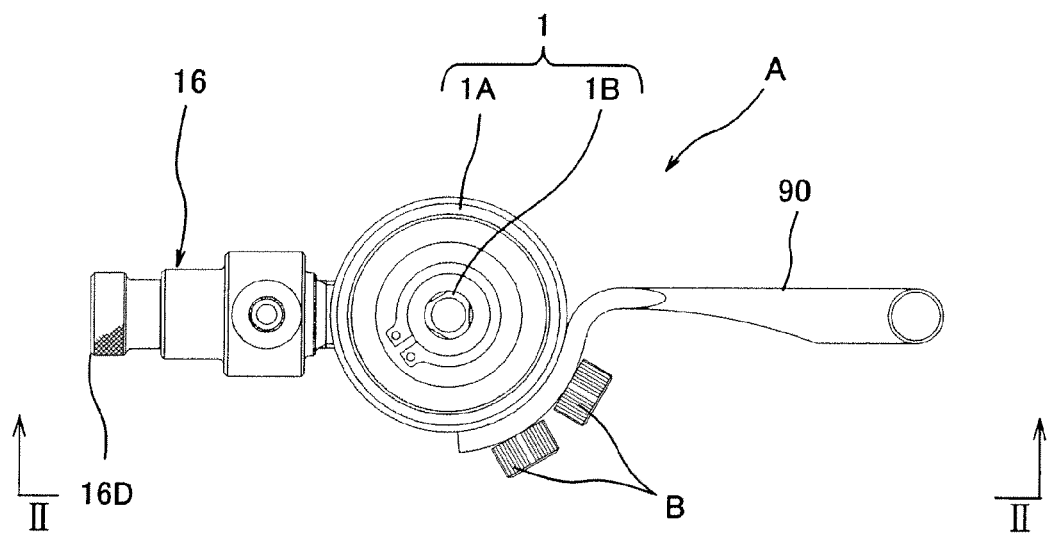
FIG. 1 is a plan view of an arbor of a shank attachment structure according to Embodiment 1 of the present invention when viewed from a side of the arbor which is attached to a drilling device.

A arbor
C cutter
2 shank attachment hole
3 coolant supplying hole
4 sealing member
5 valve body
15 engaging member
20 first sleeve
1B body portion
30 shank
31 concave portion

BEST MODE FOR CARRYING OUT THE INVENTION

Hereinafter, a shank attachment structure according to embodiments of the present invention will be specifically explained in reference to the drawings. However, the present invention is not limited to these embodiments.

Embodiment 1

Figure 2:
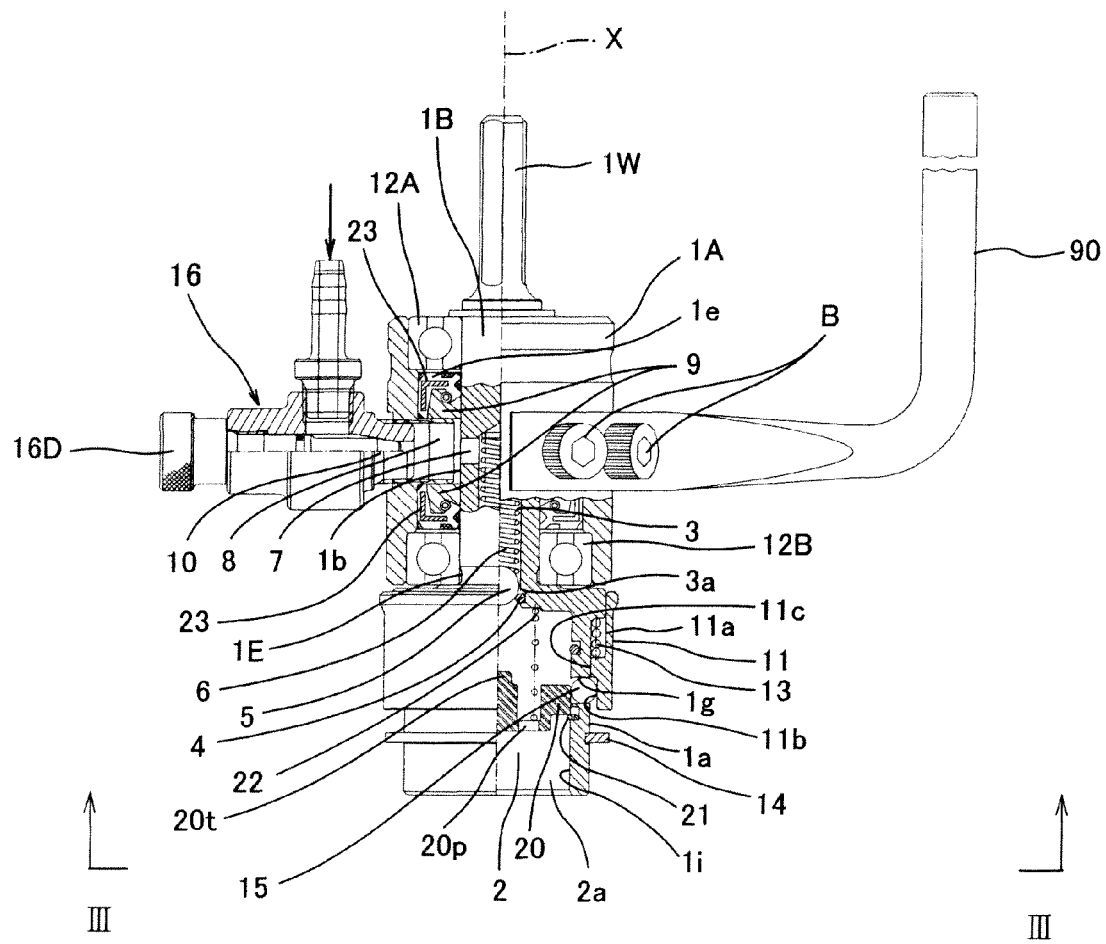
FIG. 2 is a partially cross-sectional side view of an internal configuration of the arbor when viewed from a direction indicated by arrows II-II of FIG. 1.
Figure 3:
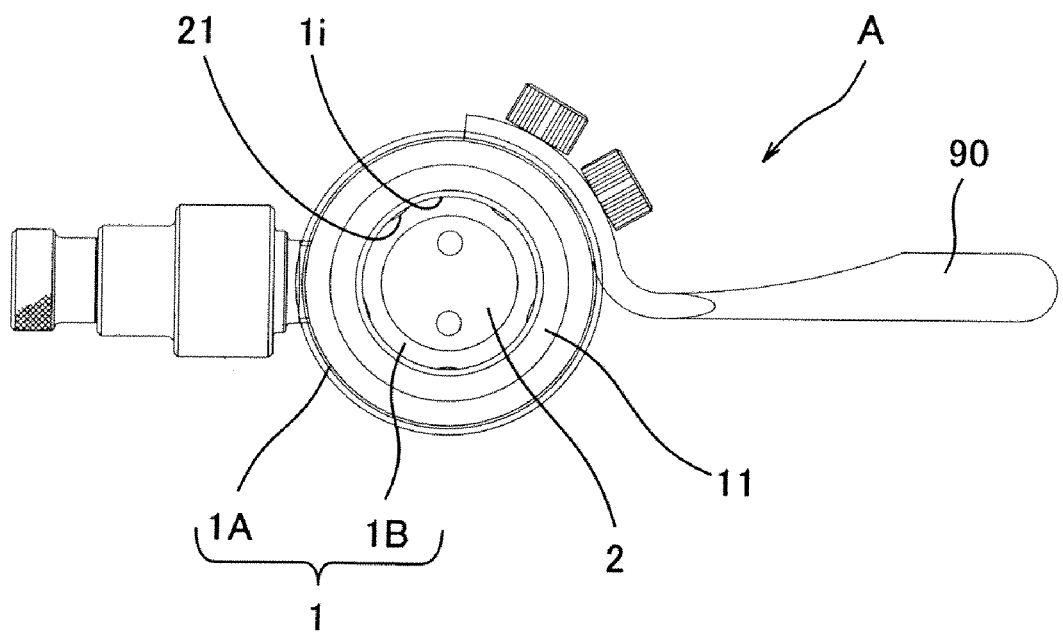
FIG. 3 is a bottom view of the arbor of the shank attachment structure when viewed from a direction indicated by arrows III-III of FIG. 2.

FIG. 1 is a plan view of an arbor according to the present embodiment when viewed from a side of a drilling device. FIG. 2 is a partially cross-sectional side view of an internal configuration of the arbor when viewed from a direction indicated by arrows II-II of FIG. 1. FIG. 3 is a bottom view of the arbor when viewed from a direction indicated by arrows III-III of FIG. 2.

In FIGS. 1 to 3, "A" denotes the arbor. As shown in FIGS. 1 to 3, the arbor A includes an arbor main body 1, and the arbor main body 1 includes: a body portion 1B which is integrally attached to a rotating shaft of a drilling device (not shown) to rotate integrally with the rotating shaft; and a fixing member 1A which covers an outer periphery of a base end portion (upper half portion in FIG. 2) of the body portion 1B so as to rotatably support the body portion 1B.

The fixing member 1A is fixed to and non-rotatably supported by, for example, a body of the drilling device (not shown) using a fixing bracket 90 which is integrally attached to the fixing member 1A by attachment bolts B.

As shown in FIG. 2, in the present embodiment, the body portion 1B has a cylindrical shape having a step portion 1E which is a diametrically expanded tip end portion at a portion lower than a center of the body portion 1B, and is rotatably supported at a portion higher than the step portion 1E in a cylindrical body portion supporting hole 1e, formed at a center of the fixing member 1A, via a pair of bearings 12A and 12B which are disposed on a base end side and tip end side of the body portion 1B to be spaced apart from each other. In order to prevent the coolant from leaking from attachment portions of the bearings 12A and 12B, a sealing member 23 is disposed between the fixing member 1A and the body portion 1B, that is, a sealing member 23 is disposed on each of the attachment portions of the bearings 12A and 12B.

The diametrically expanded tip end portion of the body portion 1B has a cylindrical shank attachment hole 2 whose center coincides with a central axis X of the arbor main body 1, whose tip end opens on its tip end (lower end in FIG. 2) surface, and which extends from an opening 2a toward the base end side (upper side in FIG. 2).

Moreover, a diametrically contracted base end portion of the body portion 1B has an attachment shaft portion 1W which is attached to a chuck of the drilling device (not shown). Further, at a radially central portion of a position lower than the attachment shaft portion 1W of the body portion 1B, a cylindrical coolant supplying hole 3 having a smaller diameter than the shank attachment hole 2 is formed concentrically with the shank attachment hole 2 such that a tip end of the coolant supplying hole 3 communicates with a base end of the shank attachment hole 2. Since a below-described coil spring 6 is disposed in the coolant supplying hole 3, a part of the coolant supplying hole 3 is hidden by the coil spring 6 in FIG. 2

In the present embodiment, a concave ring groove 3A whose cross section has a rectangular shape and opens radially inwardly is formed around an inner peripheral surface of a tip end portion (lower end portion in FIG. 2) of the coolant supplying hole 3, that is, around an inner peripheral surface of a portion where the step portion 1E is formed. In the ring groove 3A, an O ring (sealing member) 4 made of an elastic body (made of rubber in the present embodiment) is disposed such that an inner peripheral portion of the O ring 4 projects radially inwardly from an inner peripheral surface of the coolant supplying hole 3. Moreover, on the base end side in the coolant supplying hole 3 in which the O ring 4 is disposed, a valve body 5 constructed of a metal sphere is disposed to be movable in a portion of the coolant supplying hole 3 which is located on the base end side of the O ring 4. Further, the valve body 5 is biased from the base end side (upper end side in FIG. 2) toward the tip end side (toward the O ring 4) by the coil spring 6. The valve body 5 is constructed of the sphere in the present embodiment. However, the valve body 5 may be constructed of the other shape, such as a cylindrical body whose tip end is a cone shape. Alternatively, the valve body may have a shape described in Embodiment 3. The sealing member is constructed of the O ring 4 in the present embodiment. However, the sealing member may be constructed of a shape other than the O ring.

A tip end (radially inner end, upstream end) of a first coolant supplying passage 7 extending in a radial direction in the body portion 1B communicates with the base end portion (upper end portion in FIG. 2) of the coolant supplying hole 3 so as to be perpendicular to the base end portion of the coolant supplying hole 3. A base end (radially outer end, downstream end) of the first coolant supplying passage 7 is exposed on an outer peripheral surface 1b of the body portion 1B.

On an inner peripheral surface of the fixing member 1A, a second coolant supplying passage 8 constructed of a ring-shaped space is formed to communicate with the base end (downstream end) of the first coolant supplying passage 7.

In the present embodiment, the second coolant supplying passage 8 is formed on a radially inner side of a flange member 9 which is integrally attached to the fixing member 1A and is made of a ring-shaped polymeric material (synthetic rubber for example) which forms a part of the fixing member 1A. An inner peripheral surface of the flange member 9 fluid-tightly covers the body portion 1B of the arbor main body 1. On one side (left side in FIG. 2) of the flange member 9, a pipe-shaped third coolant supplying passage 10 is formed to communicate with the second coolant supplying passage 8. In the present embodiment, a tip end of the third coolant supplying passage 10 gets into an inside of the flange member 9.

Figure 9:
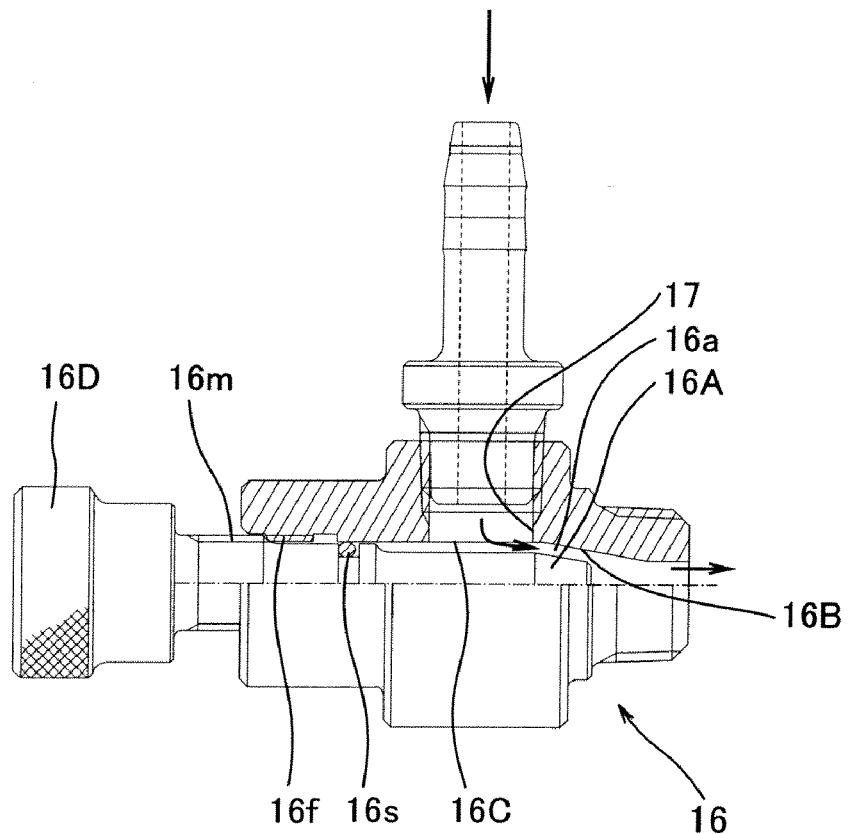
FIG. 9 is a partially cross-sectional view of the configuration of a flow rate adjuster of the shank attachment structure shown in FIG. 2.
Figure 10:
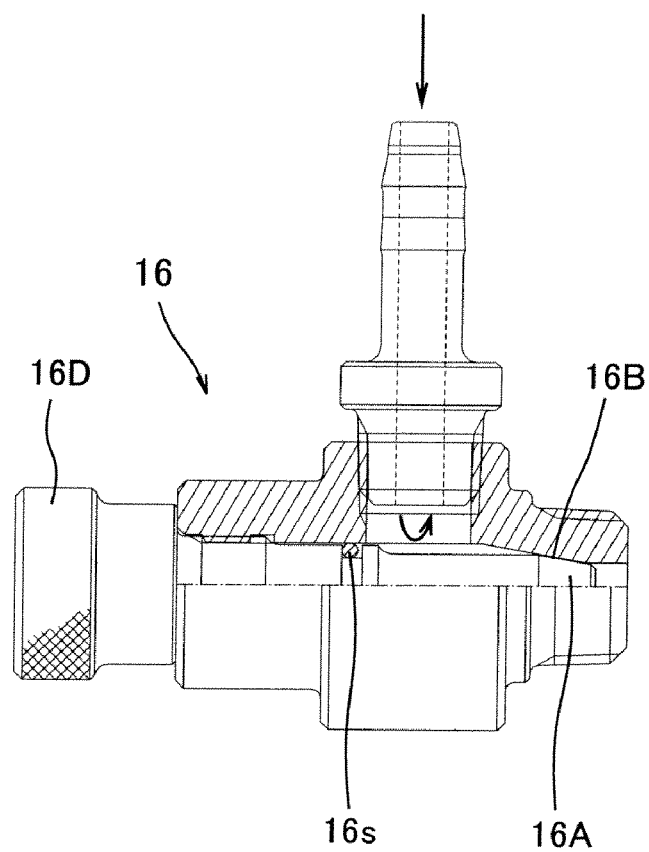
FIG. 10 is a view showing that the flow rate adjuster shown in FIG. 9 is adjusted so as not to supply the coolant.

A flow rate adjuster 16 is disposed at a base end portion of the third coolant supplying passage 10. As shown in a partially cross-sectional enlarged view of FIG. 9, the flow rate adjuster 16 is configured such that: a core member 16A having a tapered outer shape having the same tapered angle as a tapered hole 16B is disposed in the tapered hole 16B; a gap 16a whose passage cross-sectional area can be changed arbitrarily by causing the core member 16A to move in a longitudinal direction (crosswise direction in FIGS. 2, 9 and 10) of the hole 16B is formed between an inner peripheral surface of the hole 16B and an outer peripheral surface of the core member 16A to adjust the flow rate of the coolant which passes through between the inner peripheral surface of the hole 16B and the outer peripheral surface of the core member 16A. Moreover, a straight hole 16C is formed to be connected to a base end side (left side in FIGS. 2, 9 and 10) of the tapered hole 16B. A fourth coolant supplying passage 17 whose base end (downstream end) is connected to a coolant supplying hose (not shown) communicates with an outer peripheral surface of the hole 16C. Moreover, an internal thread 16f is formed on an inner peripheral surface of a base end portion of the hole 16C, and an external thread 16m which threadedly engages the internal thread 16f is formed on a base end portion of the core member 16A. With this thread mechanism, the size of the gap 16a can be changed from "none" (see FIG. 10) to any size. Moreover, an adjustment knob 16D for operating the thread mechanism is integrally formed on the base end of the core member 16A. In FIGS. 9 and 10, a reference number 16s denotes a sealing member for sealing between the core member 16A and the hole 16B.

A plurality of (for example, three in the present embodiment) supporting holes 1g each of which penetrates a diametrically expanded tip end portion 1d of the body portion 1B in a direction (radial direction) perpendicular to an axial direction of the shank attachment hole 2, is circular in cross section and supports an engaging member 15 are formed on the diametrically expanded tip end portion 1d of the body portion 1B to be spaced apart from each other in a circumferential direction of the diametrically expanded tip end portion 1d of the body portion 1B. The engaging member 15 made of metal and having a spherical shape is disposed in the supporting hole 1g so as to be movable in a radial direction of the body portion 1B.

A longitudinal dimension of the supporting hole 1g, in other words, the thickness of a portion of the body portion 1B where the supporting hole 1g is formed has a dimension smaller than the diameter of the engaging member 15. Therefore, a part of the engaging member 15 held in the supporting hole 1g projects from an outer peripheral surface 1a or inner peripheral surface 1i of the body portion 1B.

On a cylindrical outer peripheral side of the body portion 1B on which the supporting holes 1g are formed, a second sleeve 11 is disposed to be slidable along the outer peripheral surface 1a of the body portion 1B in an axial direction (longitudinal direction, vertical direction in FIG. 2). In the present embodiment, the second sleeve 11 is pressed by a coil spring (second elastic member) 13 toward the tip end side (lower end side in FIG. 2) of the arbor A.

Figure 7:
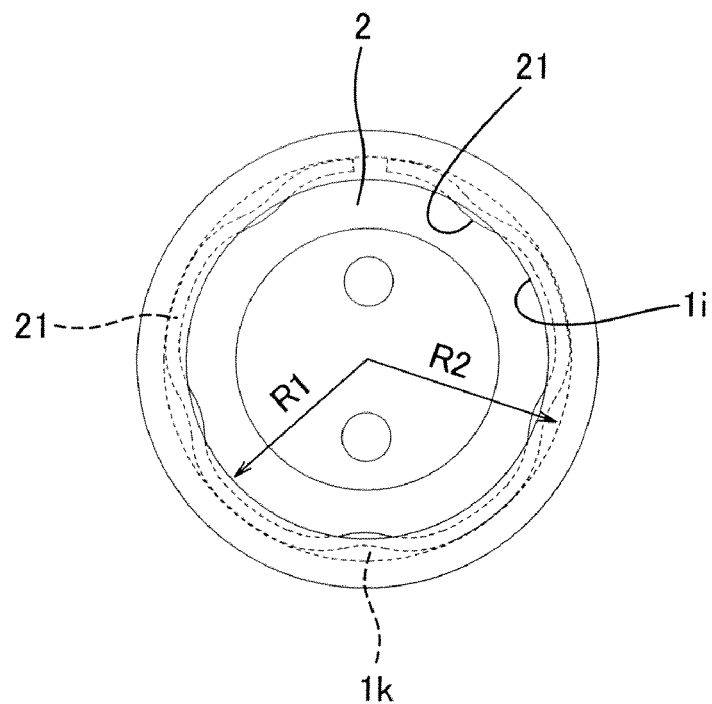
FIG. 7 is a diagram when viewed from a bottom surface side of the shank attachment hole in a state in which a first stopper ring is inserted into an engaging concave portion of the shank attachment hole, and a part of the first stopper ring projects radially inwardly from an inner peripheral surface of the shank attachment hole.

Moreover, a second stopper ring 14 which restricts the movement of the second sleeve 11 toward the tip end side is disposed on a portion of the body portion 1B which is below the second sleeve 11. The second stopper ring 14 is engaged with an engaging concave portion 1k (see FIG. 7) formed on the outer peripheral surface of the body portion 1B. Thus, the second stopper ring 14 is fixed there in the axial direction.

A diametrically expanded portion 11a for holding the coil spring (second elastic member) 13 is formed on an inner periphery of a base end portion of the second sleeve 11, and a diametrically expanded portion 11b for holding a part of the engaging member 15 is formed on an inner periphery of a tip end portion of the second sleeve 11. The diametrically expanded portion 11b formed on the inner periphery of the tip end portion of the second sleeve 11 forms a second cam surface. A non-diametrically expanded portion 11c at a center portion between the diametrically expanded portion 11a and the diametrically expanded portion 11b forms a first cam surface. To be specific, when the engaging member 15 contacts the diametrically expanded portion 11b, a portion of the engaging member 15 which projects from the outer peripheral surface 1a of the body portion 1B is held in the diametrically expanded portion 11b. In contrast, when the engaging member 15 contacts the non-diametrically expanded portion 11c, the engaging member 15 is pressed radially inwardly, and the engaging member 15 projects from an inner peripheral surface of the body portion 1B.

The coil spring 13 is disposed such that an inner periphery thereof conforms to the outer peripheral surface 1a of the arbor main body 1 and an outer periphery thereof conforms to an inner periphery of the diametrically expanded portion 11b of the second sleeve 11.

A first sleeve 20 having a coolant passing hole 20p is disposed in the shank attachment hole 2 so as to be movable in a longitudinal direction (axial direction) of the shank attachment hole 2. Moreover, at a portion of the shank attachment hole 2 which is below a portion where the supporting hole 1g is formed, a first stopper ring 21 that is a retaining ring member is disposed to prevent the first sleeve 20 from moving lower than the first stopper ring 21. The first sleeve 20 is biased toward the tip end side by a coil spring (first elastic member) 22 disposed on a base end side of the first sleeve 20.

Figure 8:
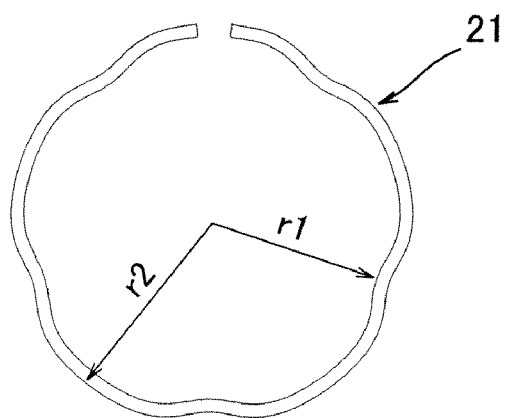
FIG. 8 is a plan view of the configuration of the first stopper ring shown in FIG. 7.

As shown in an enlarged view of FIG. 8, the first stopper ring 21 has an inner diameter r1 that is a minimum diameter portion which is smaller than an outer diameter R1 of a base end of a below-described shank 30, and an outer diameter r2 that is a maximum diameter portion which is larger than an outer diameter R2 of a below-described engaging concave portion in a case where no external force is applied to the first stopper ring 21. In plan view, the first stopper ring 21 has such a wavy ring shape that some portions of the first stopper ring 21 project radially outwardly from a virtual perfect circle and the other portions are depressed from the virtual perfect circle. The first stopper ring 21 is constructed of an elastic member, such as spring steel. The first stopper ring 21 is configured such that when a tip end of the shank 30 contacts the first stopper ring 21, at least an inner peripheral portion of the first stopper ring 21 deforms in a thickness direction to diametrically expand an inner diameter dimension of the first stopper ring 21.

The first stopper ring 21 is engaged with the engaging concave portion 1k (see FIG. 7) formed around the inner peripheral surface of the shank attachment hole 2. Thus, the first stopper ring 21 is fixed there.

The first sleeve 20 is configured to be slidable in the shank attachment hole 2 in a state in which an outer peripheral surface of the first sleeve 20 substantially contacts the inner peripheral surface of the shank attachment hole 2. Moreover, the first sleeve 20 is configured such that the outer peripheral surface of the first sleeve 20 pushes out the engaging member 15 radially outwardly.

The coil spring 22 is disposed such that a tip end thereof is supported by a receiving seat formed on a base end surface (upper end surface) of the first sleeve 20, and a base end thereof is supported by a receiving seat formed on an upper end surface of the shank attachment hole 2.

A pressing portion 20t capable of pressing the valve body 5 from the tip end side to the base end side projects from a central portion of an upper end surface of the first sleeve 20. In a state in which the first sleeve 20 moves toward the base end side in the shank attachment hole 2, the pressing portion 20t presses the valve body 5 to cause the valve body 5 to move toward the base end side.

In the present embodiment, the first sleeve 20 is configured to function as a valve body operating member capable of pressing the valve body 5 to cause the valve body 5 to be separated from the O ring 4. However, as in Embodiment 3 described below, it is possible to realize as another embodiment such a configuration that the configuration (function) of the valve body operating member is removed from a first sleeve 220. Details of this configuration will be explained in detail in Embodiment 3 described below.

Figure 4:
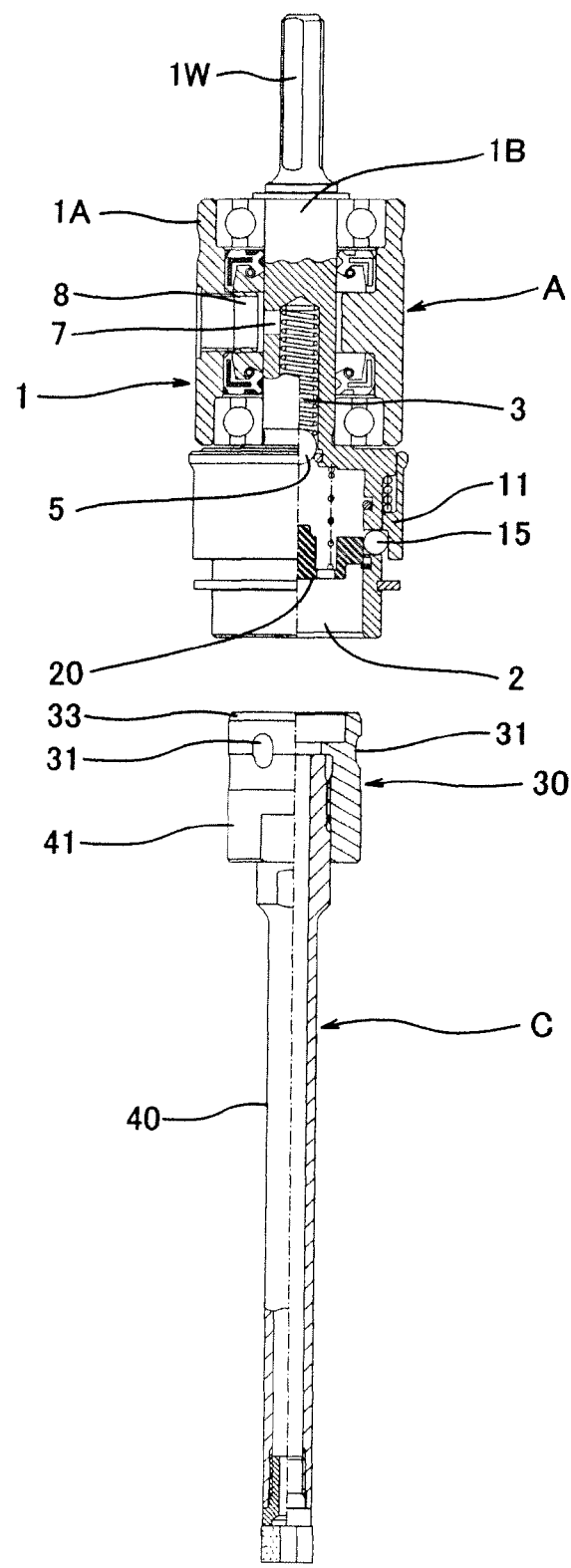
FIG. 4 shows that a cutter is not yet attached to the arbor shown in FIG. 1 and is a partially cross-sectional side view of internal configurations of the arbor and cutter of the shank attachment structure.

As shown in FIGS. 2 and 4, in a state in which a shank 25 of a cutter C is not inserted into the shank attachment hole 2 of the arbor A, a tip end of the first sleeve 20 contacts the first stopper ring 21 by the coil spring 22, and an outer peripheral surface of the first sleeve 20 pushes out the engaging member 15 toward the radially outer side of the supporting hole 1g. In this state, since a radially outer end of the engaging member 15 projects radially outwardly from the outer peripheral surface 1a of the body portion 1B, the engaging member 15 is located at the diametrically expanded portion (second cam surface) 11b of the second sleeve 11, so that the second sleeve 11 cannot move downward by the engaging member 15. In such state, the coil spring 13 is in a compressed state.

The shank 30 of the cutter C which is inserted into the shank attachment hole 2 of the arbor A is configured as below. To be specific, the outer diameter of the shank 30 is substantially equal to (to be precise, slightly smaller than) the inner diameter of the shank attachment hole 2. As shown in FIG. 4, an outer peripheral edge of the base end of the shank 30 is subjected to chamfering (taper machining) so as to have an outer diameter that is smaller than the minimum diameter portion of the inner periphery of the first stopper ring 21. In FIG. 4, the chamfered portion is shown by a reference number 33.

A plurality of (three in the present embodiment) concave portions 31 for holding a part of the engaging member 15 are formed on a position on a slightly tip end side from the base end of the shank 30 so as to be spaced apart from each other in a circumferential direction. A distance between the concave portions 31 in the circumferential direction is equal to a distance between the engaging members 15 in the circumferential direction. However, the distance between the concave portions 31 may be ½ or ¼ of the distance between the engaging members 15.

Moreover, the concave portion 31 is formed to have an elongated shape in a longitudinal direction (axial direction) of the cutter C such that the engaging member 15 is movable in the axial direction even when a part of the engaging member 15 is held in the concave portion 31. In the present embodiment, a longer diameter of the concave portion 31 is about twice to three times a shorter diameter of the concave portion 31. However, the present embodiment is not limited to these numerical values. According to need, the longer diameter may be, for example, 1.5 to 4 times or 1.3 to 6 times the shorter diameter depending on the amount of movement of the valve body 5.

In the present embodiment, as shown in, for example, FIG. 4, the cutter C is constructed of a cutter main body 40 and an attachment member 41 which is integrally attached to an upper end of the cutter main body 40 and is attached to the arbor A. Of course, these may be integrally formed as the cutter C.

Moreover, the type of the cutter C may be a core cutter as in the present embodiment or may be a cutter other than the core cutter.

In accordance with the shank attachment structure configured as above, the shank 30 of the cutter C can be detachably attached to the shank attachment hole 2 of the arbor A as described below, and the coolant can be supplied to the tip end of the cutter C at the time of drilling holes by causing the coolant to flow through the inside of the arbor A in a state in which the shank 30 is attached to the shank attachment hole 2.

Figure 5:
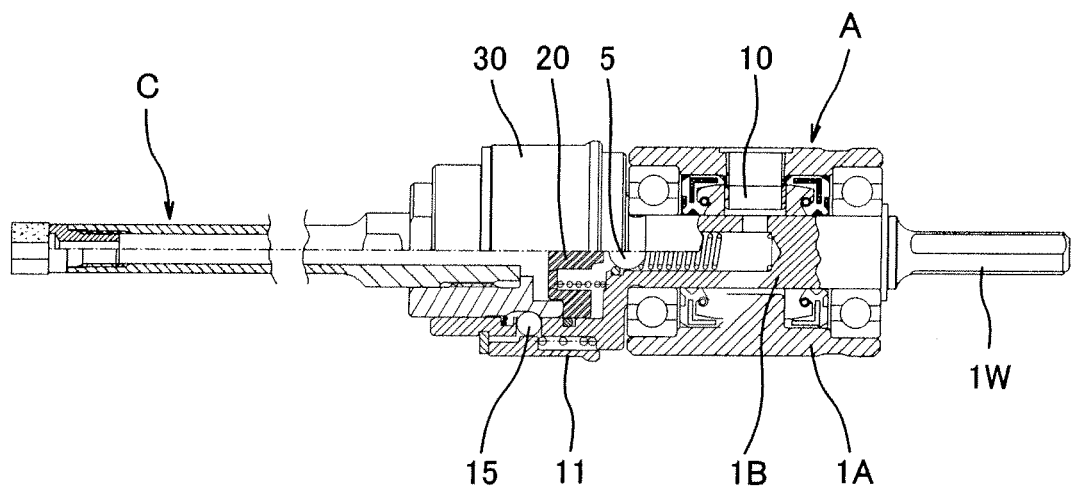
FIG. 5 shows that a shank of the cutter has attached to the shank attachment hole of the arbor after the state shown in FIG. 4 and is a partially cross-sectional side view of an internal configuration of the shank attachment structure.

To be specific, as shown in FIG. 4, in the case of attaching (inserting) the cutter C to (into) the arbor A, the cutter C is inserted into the shank attachment hole 2 in a state in which the shank 30 of the cutter C fits in the shank attachment hole 2 of the arbor A. In the process of this insertion, when the base end of the cutter C contacts the stopper ring 21, the chamfered portion 33 of the cutter C causes the stopper ring 21 to deform (to diametrically expand), so that the shank 30 can be further inserted into the shank attachment hole 2. When the shank 30 is further inserted, the base end of the shank 30 contacts the first sleeve 20, so that the first sleeve 20 moves toward the base end side. In this movement, the engaging member 15 is transferred from the outer peripheral surface of the first sleeve 20 to the outer peripheral surface of the shank 30. When the engaging member 15 gets into the concave portion 31 of the shank 30, the engaging member 15 moves radially inwardly, so that the engaging member 15 having projected from the outer peripheral surface 1a of the body portion 1B moves radially inwardly. As a result, the second sleeve 11 having been biased by the coil spring 13 toward the tip end side moves toward the tip end side. In this state, the non-diametrically expanded portion 11c that is the first cam surface of the second sleeve 11 maintains a state in which the engaging member 15 is caused to move radially inwardly. Therefore, as shown in FIG. 5, the cutter C is engaged with the arbor A via the engaging member 15. As a result, the cutter C is integrally supported by the arbor A.

Figure 6:
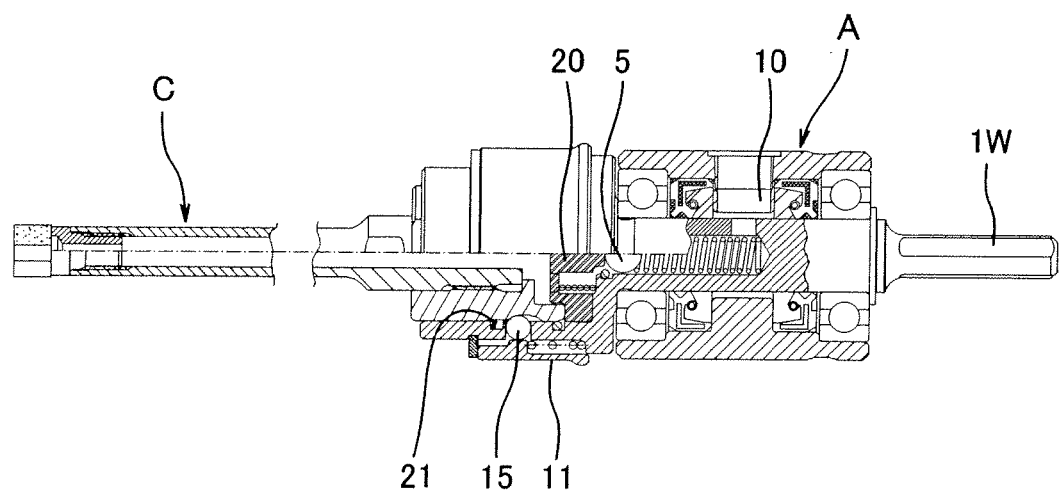
FIG. 6 is a partially cross-sectional side view of the internal configuration of the shank attachment structure in a state in which the cutter is further inserted toward a base end side from the state shown in FIG. 5 at the time of drilling.

In this state, in the case of pressing the cutter C from the base end side in a state in which the tip end of the cutter C contacts a surface to be drilled, the shank 30 of the cutter C is further inserted into the shank attachment hole 2 of the arbor A, and as shown in FIG. 6, the first sleeve 20 further moves in the shank attachment hole 2 toward the base end side, and the pressing portion 20t of the first sleeve 20 causes the valve body 5 to move toward the base end side. In this state, the shank attachment hole 2 and the first coolant supplying passage 7 communicate with each other. Therefore, the coolant is supplied to the tip end side of the cutter C through the first coolant supplying passage 7, the shank attachment hole 2 and the coolant passing hole 20p.

In the case of the shank attachment structure, when the supply amount of the coolant is inappropriate, the flow rate adjuster 16 is adjusted, to be specific, the adjustment knob 16D is rotated clockwise or counterclockwise to change the gap 16a formed between the inner peripheral surface of the hole 16B and the outer peripheral surface of the core member 16A, thereby supplying an appropriate amount of coolant in accordance with a situation of drilling. Specifically, a state in which the gap 16a corresponding the above adjusted amount is formed as shown in FIG. 9 can be formed from a state in which the inner peripheral surface of the hole 16B and the outer peripheral surface of the core member 16A tightly contact each other to form no gap 16a as shown in FIG. 10.

Moreover, when detaching the cutter C from the arbor A, the second sleeve 11 is slid toward the base end side with respect to the body portion 1B, so that the engaging member 15 can move radially outwardly. In this state, the cutter C is pressed from the base end side by a stretching force of the coil spring 22. Thus, the engaging member 15 is pushed out radially outwardly. As a result, the engagement between the cutter C and the arbor A is canceled, and the cutter C can be easily detached from the arbor A.

Embodiment 2

In Embodiment 1, the first stopper ring 21 is disposed on the tip end side of the first sleeve 20 to restrict the movement of the first sleeve 20 to the tip end side of the first stopper ring 21. However, instead of this, the present invention can be configured as in Embodiment 2 shown in FIG. 11.

To be specific, in Embodiment 2, a protruding portion 1201r expanding radially outwardly is disposed around a base end portion of a first sleeve 120, and a third sleeve 140 in which a coolant supplying hole 103 is formed on a radially inner side thereof and a protruding portion 103r protruding radially inwardly is disposed around an inner peripheral side of a tip end thereof is detachably attached in a body portion 101B. A stopper ring 140A is disposed on a tip end side of the protruding portion 120r of the first sleeve 120 such that the first sleeve 120 does not protrude from a shank attachment hole 102 of the body portion 101B toward the tip end side. Moreover, a diametrically expanded step portion 140a is formed on an inner peripheral surface of a base end side of the third sleeve 140. An O ring 104 is disposed at the step portion 140a to seal the coolant between the step portion 140a and a valve body 105.

Figure 11:
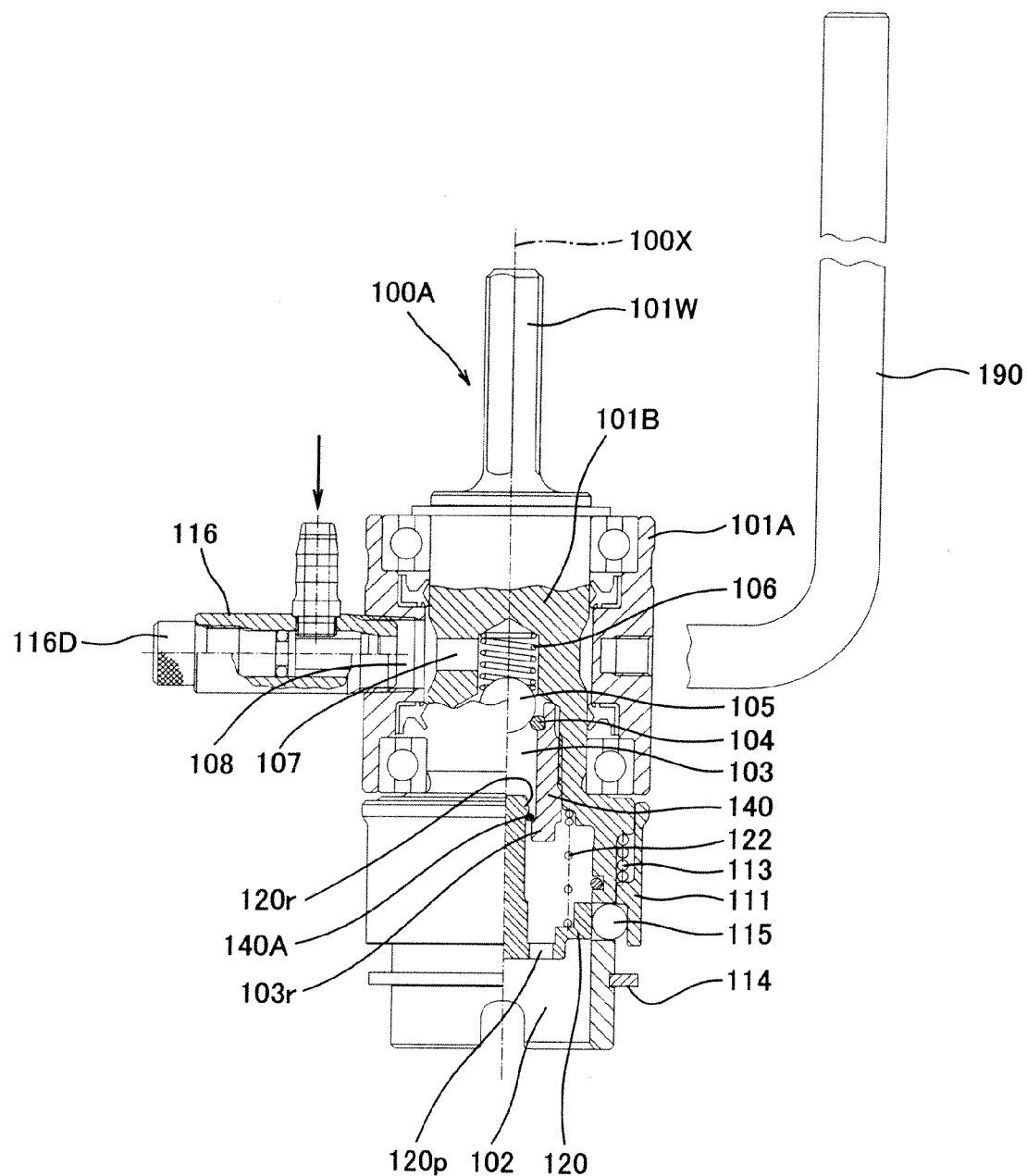
FIG. 11 is a partially cross-sectional side view of the configuration of the shank attachment structure according to an embodiment (Embodiment 2) different from the embodiment shown in FIGS. 1 to 10.

Although this configuration is structurally and slightly more complex than that of the shank attachment structure in Embodiment 1, it excels in durability. In FIG. 11 showing Embodiment 2, reference numbers obtained by adding 100 to the reference numbers of the major components of Embodiment 1 are used for components that are the same as or corresponding to the major components of Embodiment 1, and repetition of the same explanation is avoided.

Embodiment 3

Figure 12:
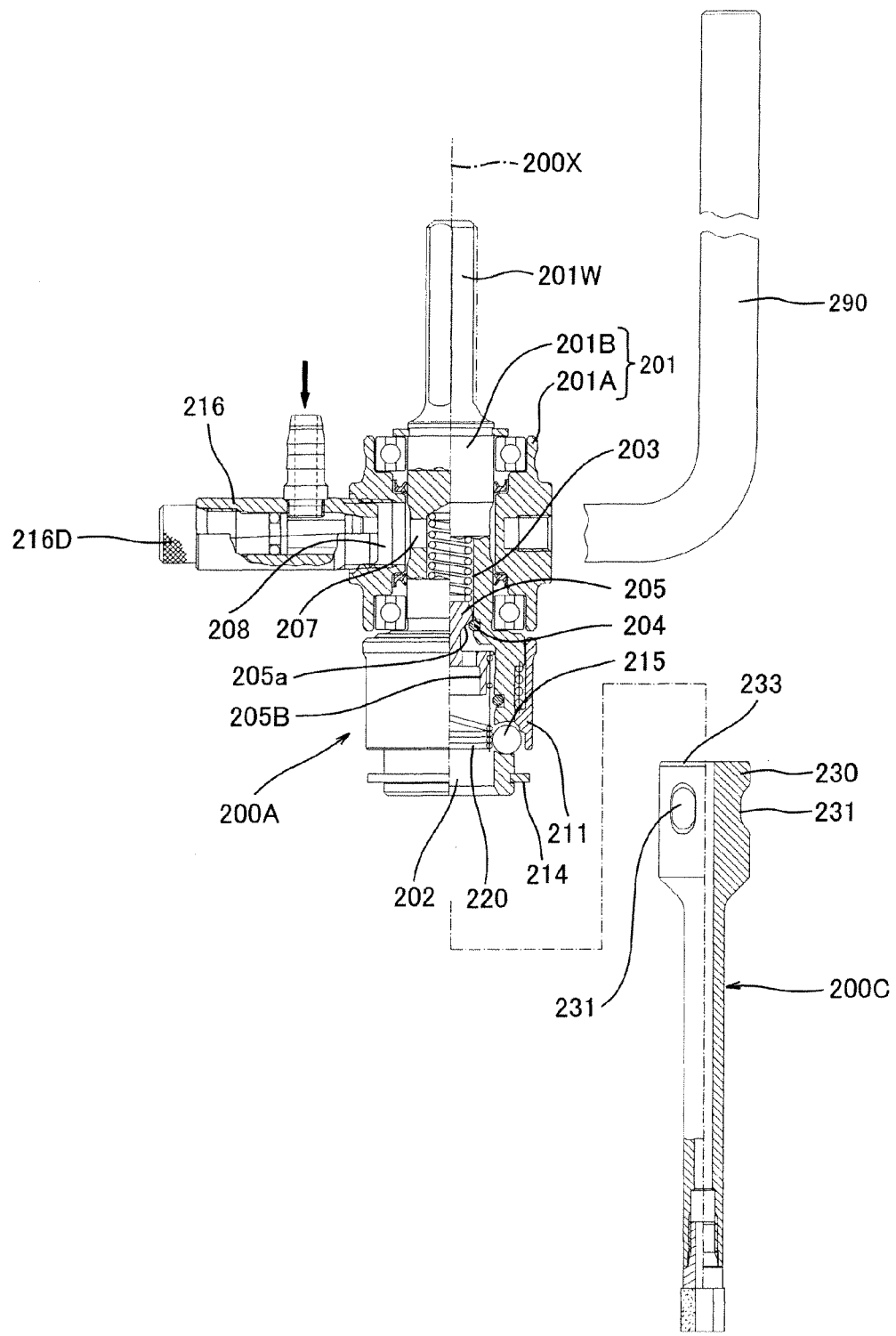
FIG. 12 is a partially cross-sectional side view of the shank attachment structure according to an embodiment (Embodiment 3) different from Embodiments 1 and 2 and is a view showing that the cutter is not yet attached to the arbor.
Figure 13:
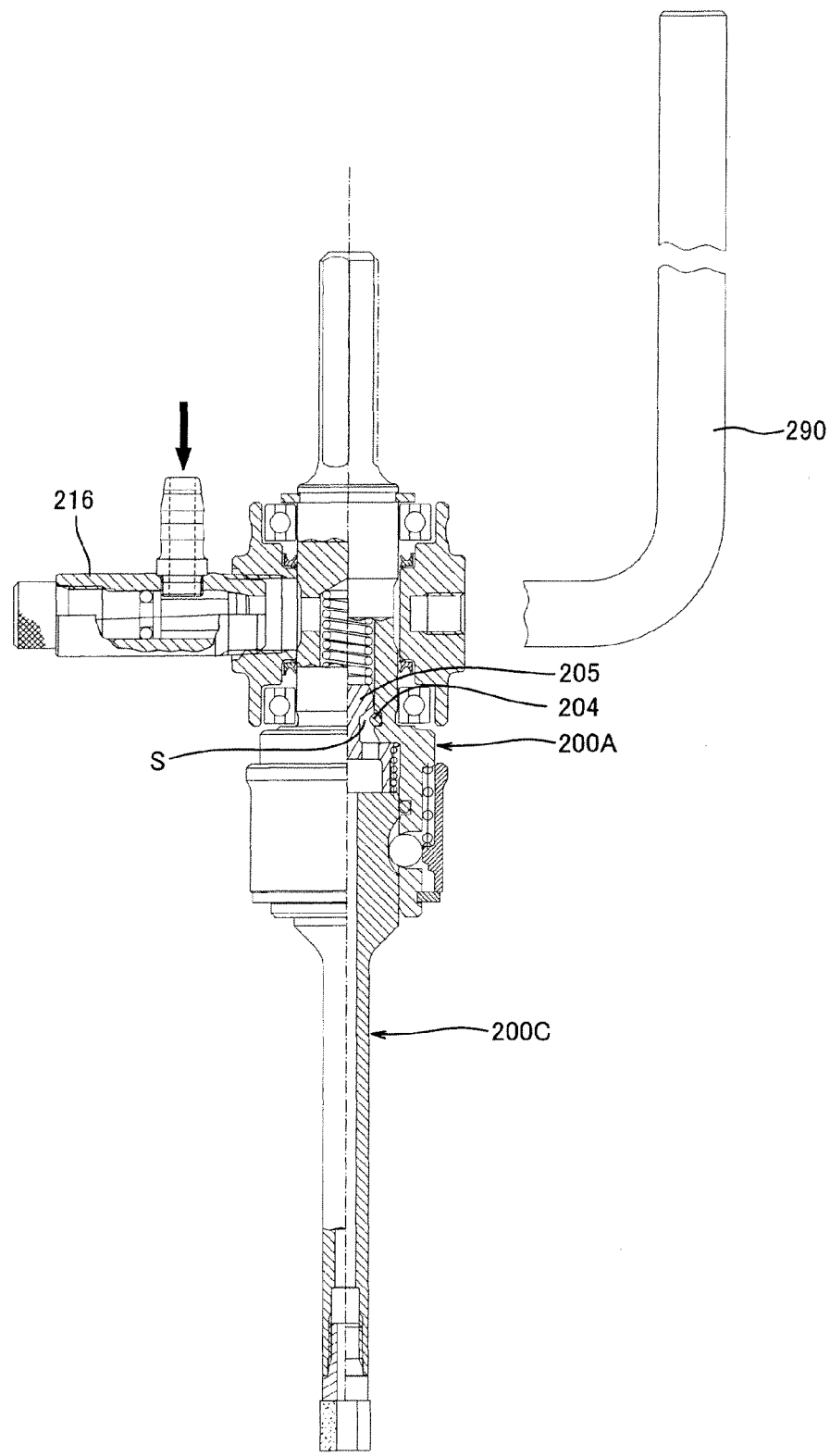
FIG. 13 is a partially cross-sectional side view of the shank attachment structure in a state in which the shank of the cutter is inserted into the shank attachment hole of the arbor after the state shown in FIG. 12 and then the shank of the cutter is further inserted toward the base end side at the time of drilling.

In order to supply or stop supplying the coolant from the coolant supplying hole 3 or 103, Embodiment 1 or 2 adopts a sphere as the valve body 5 or 105. However, as shown in FIGS. 12 and 13, a columnar member whose base end portion and tip end portion have different diameters and which has at an intermediate portion thereof a tapered sheet surface 205a, diametrically contracted on the tip end side, on an outer peripheral surface thereof may be used as a valve body 205. Even in this case, effects that are basically the same as those of Embodiments 1 and 2 can be obtained when supplying the coolant. To be specific, a base end of a shank 230 of a cutter 200C contacts and presses a tip end of a large diameter portion 205B connected to a tip end of the columnar valve body 205 to cause the valve body 205 to be separated from an O ring 204 disposed on a tip end portion of a coolant supplying hole 203. Thus, through a gap s (see FIG. 13) formed between the O ring 204 and the valve body 205, the coolant can be supplied to the shank attachment hole 202 of an arbor 200A. Moreover, in Embodiment 3, the large diameter portion 205B which functions as the valve body operating member is formed at a lower portion of the valve body 205 integrally with the valve body 205. Therefore, unlike Embodiments 1 and 2, the below-described first sleeve 220 in Embodiment 3 does not press the valve body 205 to cause the valve body 205 to be separated from the O ring 204. Instead of the configuration of Embodiment 3, the valve body operating member formed integrally with the valve body 205 may be formed separately.

Moreover, in the case of the shank attachment structure of Embodiment 3, a coil spring is used as the first sleeve 220 instead of the first sleeves 20 and 120 of Embodiments 1 and 2, and an engaging member 215 can be pushed out radially outwardly by this coil spring. Moreover, the coil spring constituting the first sleeve 220 also serves as the coil spring 22 of Embodiment 1 and a coil spring 122 of Embodiment 2. To be specific, when detaching the cutter 200C, the coil spring functions to push out the cutter 200C from the shank attachment hole 202 toward an outer side by its elastic force. This configuration is preferable since the number of components can be reduced.

In FIGS. 12 and 13 showing Embodiment 3, reference numbers obtained by adding 200 to the reference numbers of the major components of Embodiment 1 are used for components that are the same as or corresponding to the major components of Embodiment 1, and repetition of the same explanation is avoided.

The present invention is not limited to Embodiments 1 to 3, and of course, various modifications can be carried out within the same technical idea.

INDUSTRIAL APPLICABILITY

The shank attachment structure according to the present invention can be utilized when attaching and detaching a cutting tool, such as a cutter, to and from a drill press, a handheld power drill, a hammer drill or the like.

The invention claimed is:

1. A shank attachment structure capable of detachably attaching a shank of a cutter to a tubular shank attachment hole with a single motion, the shank having at a base end portion thereof a concave portion for holding a part of an engaging member, and the shank attachment hole being formed such that: the engaging member projects radially inwardly from an inner peripheral surface of the shank attachment hole and is able to move radially outwardly therefrom; a longitudinal direction of the shank attachment hole extends in a body portion of an arbor in an axial direction of the arbor; and a tip end of the shank attachment hole opens on a tip end surface of the body portion, wherein:
   a coolant supplying hole is formed at a central portion of the body portion in a radial direction of the body portion and is adjacent to a base end side of the shank attachment hole such that a tip end of the coolant supplying hole communicates with the shank attachment hole;
   a valve body is disposed at a tip end portion of the coolant supplying hole so as to be movable toward a base end side, and a sealing member is disposed at a position of the coolant supplying hole which is closer to a tip end side than the valve body and contacts the valve body to form a fluid-tight state between the valve body and the sealing member;
   a first sleeve is disposed in the shank attachment hole such that: a base end of the shank contacts a tip end of the first sleeve to cause the first sleeve to move toward the base end side in the axial direction; a pressing portion contacts the valve body by this movement of the first sleeve to cause the valve body to be separated from the sealing member; in a state in which the shank is not in contact with the tip end of the first sleeve, an outer peripheral surface of the first sleeve having an outer diameter substantially equal to a diameter of the shank attachment hole causes the engaging member to move radially outwardly from an inner peripheral surface of the shank attachment hole; and
   a valve body operating member having at a base end thereof the pressing portion which presses the valve body to cause the valve body to be separated from the sealing member and having at a tip end thereof a contact surface which is contacted by the shank is disposed in the shank attachment hole.

2. The shank attachment structure according to claim 1, wherein the first sleeve and the valve body operating member are integrally connected to each other.

3. The shank attachment structure according to claim 1, wherein the valve body and the valve body operating member are integrally connected to each other.

4. The shank attachment structure according to claim 1, wherein:
   an outer diameter of the shank is set such that the shank is able to be inserted into the shank attachment hole in a state in which the engaging member has moved radially outwardly from the inner peripheral surface of the shank attachment hole;
   the concave portion is formed at the base end portion of the shank to have an elongated shape such that the shank is movable in the axial direction of the arbor for a predetermined distance in a state in which a part of the engaging member is held in the concave portion; and
   the first sleeve causes the valve body to be separated from the sealing member in a state in which the engaging member is located at a base end position of the elongated concave portion of the shank, and the first sleeve does not cause the valve body to be separated from the sealing member in a state in which the engaging member is located at a tip end position of the elongated concave portion of the shank.

5. The shank attachment structure according to claim 1, wherein:
a ring-shaped engaging concave portion is formed along a circumferential direction of the shank attachment hole at a position of a tip end side of the shank attachment hole which position is adjacent to a tip end of a region where the first sleeve moves in the axial direction, and a retaining ring member is disposed at the engaging concave portion so as to have an inner diameter that is a minimum diameter portion which is slightly smaller than an outer diameter of a base end of the shank and an outer diameter that is a maximum diameter portion which is larger than an outer diameter of the concave portion in a free state, so as to have such a wavy ring shape that a part of the retaining ring member projects radially outwardly from a virtual perfect circle and the other part is depressed from the virtual perfect circle, and so as to be formed such that the radially outwardly projecting part is deformable in an axial direction of the shank attachment hole; and
a chamfered portion is formed around an outer peripheral edge of the base end of the shank such that an outer diameter of a tip end of the chamfered portion is smaller than the minimum diameter portion of the retaining ring member.

6. The shank attachment structure according to claim 5, wherein:
a thickness of a wall of the body portion on which wall the engaging member is disposed is set to be smaller than a dimension of the engaging member in a thickness direction of the wall;
a supporting hole for supporting the engaging member is formed on the wall so as to extend in a direction perpendicular to the axial direction such that a radially inner end of the supporting hole opens on the inner peripheral surface of the shank attachment hole within the region where the first sleeve moves in the axial direction in the shank attachment hole and a radially outer end of the supporting hole opens on an outer peripheral surface of the wall;
a first elastic member is disposed on a base end side of the first sleeve in the shank attachment hole to bias the first sleeve, causing a tip end of the first sleeve to contact the retaining ring member; and
a second sleeve including a first cam surface protruding radially inwardly and a second cam surface on an inner peripheral surface thereof is disposed on an outer peripheral side of the body portion so as to be movable in one of a direction toward the tip end and a direction toward the base end in the axial direction of the arbor, so as to be able to press the engaging member radially inwardly in the supporting hole by the first cam surface in a state in which the second sleeve has moved in said one of the directions, and so as to be able to hold the engaging member radially outwardly by the second cam surface in a state in which the second sleeve has not moved, the second sleeve is pressed in said one of the directions by an elastic force of a second elastic member to cause a part of the engaging member to be held in the concave portion of the shank, and the second sleeve is kept not to move against the elastic force of the second elastic member such that the engaging member is able to move radially outwardly in the supporting hole.

7. The shank attachment structure according to claim 1, wherein:
a first coolant supplying passage whose tip end communicates with the coolant supplying hole and whose base end is exposed on an outer peripheral surface of the body portion is formed in the body portion of the arbor;
a fixing member including: a second coolant supplying passage having a ring-shaped passage which opens on an inner peripheral surface of the fixing member; a third coolant supplying passage whose tip end communicates with a base end of the second coolant supplying passage and whose base end is exposed on an outer periphery of the fixing member; and a tubular body portion supporting hole which rotatably supports the body portion on an outer peripheral side is disposed on an outer peripheral side of the body portion such that a tip end of the second coolant supplying passage communicates with the base end of the first coolant supplying passage; and
a coolant flow rate adjusting mechanism capable of changing a cross section of the third coolant supplying passage is disposed on the third coolant supplying passage of the fixing member.

8. The shank attachment structure according to claim 7, wherein the flow rate adjusting mechanism includes: a tapered hole formed on the third coolant supplying passage; a tapered core member having an outer shape corresponding to the tapered hole; and a thread mechanism which is able to cause the tapered core member to move close to or move away from the tapered hole.

9. The shank attachment structure according to claim 1, wherein the valve body is a sphere, the sealing member is an O ring made of an elastic member, and the sphere is biased by a coil spring toward the sealing member.

* * * * *

UNITED STATES PATENT AND TRADEMARK OFFICE
CERTIFICATE OF CORRECTION

PATENT NO.       : 8,371,775 B2  
APPLICATION NO.  : 12/302498  
DATED            : February 12, 2013  
INVENTOR(S)      : Masaaki Miyanaga Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1108 days.

Signed and Sealed this

First Day of September, 2015

Michelle K. Lee
*Director of the United States Patent and Trademark Office*